3,336,376
PERFLUOROCYCLOHEXANE-1,4-DIACYL FLUORIDE AND PROCESS FOR PREPARING PERFLUOROCYCLOHEXANE MONO- AND DIACYL FLUORIDES
Henry R. Nychka, Dover, and Cyril Woolf, Morristown, N.J., assignors to Allied Chemical Corporation, New York, N.Y., a corporation of New York
Filed Sept. 3, 1964, Ser. No. 394,250
7 Claims. (Cl. 260—544)

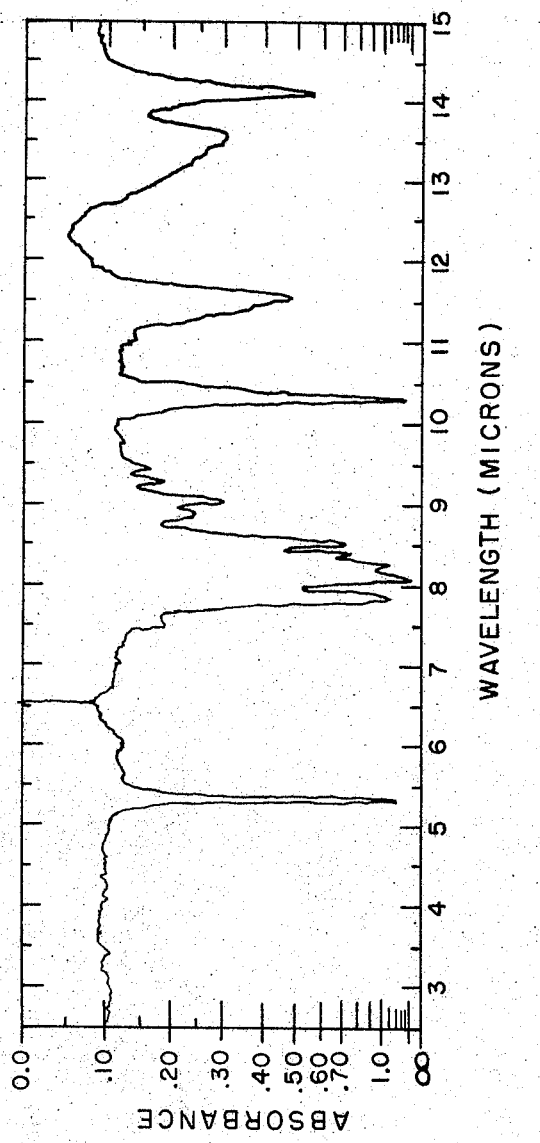
INVENTORS
HENRY R. NYCHKA
CYRIL WOOLF
BY
Elizabeth Hunter
ATTORNEY

This invention relates to perfluorocyclohexane-1,4-diacyl fluoride, to derivatives thereof and to a process for preparing perfluorocyclohexane mono- and diacyl fluorides.

Unsuccessful efforts have been made in the past to prepare perfluorocyclohexane derivatives containing as reactive functional sites one or more fluoroacyl groups with a view to providing reactive derivative building blocks which would have numerous uses, including condensation polymerization to provide polymers for use as lube additives, coatings, films, fibers, and so on.

It has been proposed to prepare perfluorocyclohexane diacyl fluorides by the electrochemical process using the ortho, meta and para benzene diacyl fluorides as starting materials. Such attempts have been largely unsuccessful.

Thus, although production of perfluorocyclohexane 1,2-dicarboxylic acid fluoride by the electrochemical fluorination of phthaloyl fluoride is reported in U.S. Patent 2,717,871, no yields are reported. Other investigators confirmed the production of low yields of the phthaloyl isomer (i.e., the 1,2 isomer) but reported failure to produce the 1,3 and 1,4 isomers from the corresponding isophthaloyl and terephthaloyl fluorides.

It is known to carry out the exhaustive fluorination of low molecular weight hydrocarbons devoid of functional groups containing hetero atoms, such as oxygen, nitrogen or sulfur, by vaporizing the hydrocarbon and contacting the vapors at temperatures of 200–400° C. with cobalt trifluoride. Efforts to adapt this procedure to the perfluorination of functional group-containing compounds have failed to result in the production of useful products in appreciable yields and have resulted in extensive cleavage of the functional groups. Attempts to prevent such cleavage by moderating the conditions, as by operating at lower temperatures, resulted in the production primarily of partially-fluorinated compounds which are undesirable and difficult to separate from the perfluorinated materials.

It is an object of the present invention to provide a new series of compounds which include perfluorocyclohexane-1,4-diacyl fluoride, the 1,4-dicarboxylic acid derivative and other derivatives thereof having the formula

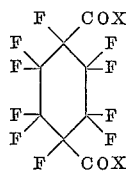

wherein X is a member selected from the group consisting of fluorine, hydroxyl (—OH), amino (—NH$_2$), alkyloxy (—O alkyl) and the hydrazino radical

Another object of the invention is to provide a process for preparing perfluorocyclohexane mono- and diacyl fluorides in appreciable yields.

It is a further particular object of the invention to provide a process for producing perfluorocyclohexane-1,4-diacyl fluoride in substantial yields.

These and other objects are accomplished by the process of our invention wherein a perfluorobenzene mono- or diacyl chloride or fluoride, dispersed in a fluid medium, is intimately contacted with a solid pulverulent fluorinating agent selected from cobalt trifluoride and silver difluoride at temperatures not substantially in excess of the boiling point of the perfluorobenzene mono- or diacyl halide for a period sufficient to insure the production of a substantial yield of completely fluorinated product uncontaminated with incompletely fluorinated compounds whereby perfluorocyclohexane monoacyl fluoride or a diacyl fluoride is produced. The acyl fluoride compound may then be converted into the carboxylic acid by hydrolysis, to the esters by reaction with alcohols, to the amide by reaction with ammonia and to the hydrazide by reaction with hydrazine.

The single figure in the drawing shows the infrared spectogram of perfluorocyclohexane-1,4-diacyl fluoride in the wave length range between 1 and 15 microns, which exhibits characteristic absorption peaks at 5.32 microns, 7.83 microns, 8.10 microns, 8.55 microns, 10.30 microns and 11.53 microns.

The process of our invention proceeds according to the equation

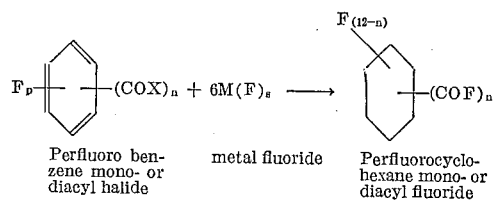

Perfluoro benzene mono- or diacyl halide    metal fluoride    Perfluorocyclohexane mono- or diacyl fluoride wherein X is a halogen selected from the group consisting of chlorine and fluorine, M is a metal selected from the group consisting of cobalt and silver, $n$ is an integer from 1 to 2, $p$ is an integer from 4 to 5; and, when $n$ is 1, $p$ is 5; when $n$ is 2, $p$ is 4; $s$ is an integer from 2 to 3; and when M is cobalt, $s$ is 3; when M is silver, $s$ is 2.

The reaction, when tetrafluoroterephthaloyl diacyl chloride is used as the starting material and cobalt trifluoride as the fluorinating agent, proceeds as follows:

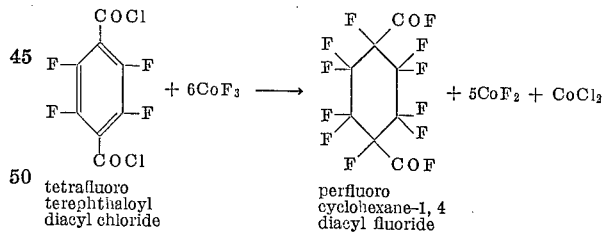

tetrafluoro terephthaloyl diacyl chloride      perfluoro cyclohexane-1, 4 diacyl fluoride It is essential for the preparation of the perfluorinated cyclohexane acyl fluorides, that no nuclear substituents other than fluorine and acyhalide groups be present on the benzene ring. Any hydrogens, or halogens other than fluorine, are not replaced by fluorine in the process of our invention and appear as incompletely fluorinated compounds in the end product.

The perfluorobenzene acyl fluorides used as starting materials in our process can be prepared simply and effectively by fluorination with alkali or alkaline earth metal fluorides at elevated temperatures, of the corresponding perchlorobenzene acyl chloride (Russian Patent 154,856) for example:

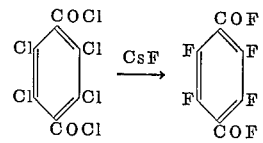

The perfluorobenzene diacyl chloride can also be prepared from commercially-available hexafluoro benzene by a series of steps which include reacting the hexafluoro benzene with hydrazine to form the pentafluorophenyl hydrazine, then reacting with a base such as NaOH to produce 1,2,4,5-tetrafluorobenzene, reacting this with lithium butyl to produce tetrafluorodilithium benzene, treating this with carbon dioxide to form the 1,4-dicarboxylic acid lithium salt, hydrolyzing to the acid, treating with thionyl chloride to produce tetrafluoroterephthaloyl diacyl chloride. The diacyl fluoride can be produced by fluorination of the diacyl chloride.

In carrying out the process of our invention, the reactants are brought together in a suitable fluid medium, which may be either liquid or gaseous, maintained at a temperature not appreciably in excess of the boiling point of the penta or tetrafluorobenzene mono- or diacyl halide, i.e., not in excess of about 300° C. Suitable temperatures are between about 150° C. and about 250° C.

When operating in the liquid phase, a suitable liquid solvent reaction medium is used, preferably a perfluorinated or fluorochloro compound boiling within the indicated range; for example, perfluorotributyl amine, boiling point 173° C., fluorochloroalkanes of 10–20 carbon atoms, perfluorochlorodicyclohexanes and the like. The penta or tetrafluorobenzene mono- or diacyl halide is dissolved in the reaction medium and mixed with powdered silver difluoride or cobalt trifluoride fluorinating agent, the latter being employed in a substantial excess of that theoretically necessary to perfluorinate the acyl halide; for example, a molar excess of between about 50% and about 150%, i.e., between about 9 moles and about 15 miles of $CoF_3$ or $AgF_2$ per mole of perfluorobenzene acyl halide.

The quantity of solvent used is sufficient to dissolve the perfluorobenzene acyl fluoride and to give an easily-stirred slurry. About 1 liter of solvent per 1.5 kilograms of $CoF_3$ or $AgF_2$ is suitable. The slurry thus produced is heated, while agitating, at the temperatures indicated until fluorination is complete as shown by the absence of the appropriate peak indicative of unsaturation in the infrared spectrogram of the reaction mass. The product may be recovered from the reaction mass by distillation. Yields of up to about 40% are obtained.

When our process is carried out in the vapor phase, the liquid tetra- or pentafluorobenzene mono- or diacyl halide is heated to a temperature somewhat below its boiling point; for example, about 50° C. to about 80° C. below its boiling point, and a stream of inert gas such as nitrogen is passed through the heated liquid at a rate controlled to entrain the desired proportion of acyl halide. The gaseous mixture is then passed through a reactor heated to the required reaction temperature; for example, between about 175° C. and about 350° C., and over or through a bed of powdered cobalt trifluoride or silver difluoride, which may be agitated if desired. The effluent from the reactor is passed through condensing zones, such as Dry Ice traps, wherein the perfluorobenzene mono- or diacyl fluoride is trapped and may be recovered.

Suitable inert gases include besides nitrogen, carbon dioxide, helium, and argon.

Reaction temperatures in the vapor phase are suitably somewhat higher than in the liquid phase and range between about 175° C. and about 350° C.

The new perfluorocyclohexane-1,4-diacyl fluoride of our invention is a colorless liquid, boiling at 106° C. It has the infrared spectrogram shown in the drawing wherein characteristic peaks occur at 5.32; 7.83; 8.10; 8.55; 10.30; and 11.53 microns.

The new perfluorocyclohexane-1,4-diacyl fluoride is useful as a monomer in condensation polymerizations dependent on its difunctionality, and is also useful in the preparation of the derivatives mentioned above. These derivatives are useful in the preparation of polymers, including polyesters, polyoxadiazoles, and polyamides.

The following specific examples further illustrate the invention. Parts are by weight except as otherwise noted.

EXAMPLE 1

*Preparation of perfluorocyclohexane-1,4-diacyl fluoride*

A 4.1 gram (0.015 mole) sample of tetrafluoroterephthaloyl diacyl chloride $C_6F_4$-1,4-$(COCl)_2$ (boiling point 215° C.), 10 grams of $CoF_3$ and 15 ml. of perfluorotributyl amine were mixed and heated for 2.5 hours at reflux (173° C.) with stirring. An additional 15 grams of $CoF_3$ was added; a 5 gram portion at the end of the 2.5-hour period, 5 grams at the end of 4 hours and 5.75 hours, after which heating was continued for an additional 1.25 hours to a total of 8 hours. At this point an infrared spectrogram test of the reaction mass indicated complete absence of unsaturation in the product. The reaction mass was distilled through a spinning band column and yielded 0.74 gram (13% yield) of perfluorocyclohexane-1,4-diacyl fluoride, $C_6F_{10}(-COF)_2$ boiling point 106°–107° C. An infrared spectrogram of the product (shown in the figure of the drawing) was prepared and showed characteristic absorption peaks at 5.32, 7.83, 8.10, 8.55, 10.30, and 11.53 microns.

Similar results are obtained when tetrafluoroterephthaloyl acyl fluoride is used in place of the tetrafluoroterephthaloyl acyl chloride in the above procedure.

EXAMPLE 2

*Preparation of dicarboxylic acid derivative*

The perfluorocyclohexane-1,4-diacyl fluoride was hydrolyzed to the corresponding dicarboxylic acid with water.

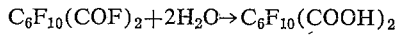
$$C_6F_{10}(COF)_2 + 2H_2O \rightarrow C_6F_{10}(COOH)_2$$

The resulting diacid is hygroscopic and formed the monohydrate as confirmed by neutral equivalent found as 183; calculated 185. The monohydrate [$C_6F_{10}(COOH)_2 \cdot H_2O$] sublimed at 158° C. An elemental analysis gave the following results:

Calculated for $C_8H_4F_{10}O_5$: C, 25.9; H, 1.08; F, 51.3. Found: C, 25.8; H, 1.20; F, 51.1.

The infrared spectrogram of the above diacid revealed an absorption band characteristic of the —C=O of the acid, at 5.6–5.7 microns.

EXAMPLE 3

*Preparation of diamide derivative*

The new perfluorocyclohexane-1,4-diacyl fluoride was converted into the diamide by dissolving a 0.43 gram portion of the $C_6F_{10}(COF)_2$ in 10 ml. of ethyl ether and passing into the solution gaseous $NH_3$. This procedure produced 0.26 grams of crude solid diamide. This diamide was water washed, resulting in a solid having a sublimation temperature of 247° C. and the elemental analysis shown below:

Found: C, 28.1; H, 1.42; F, 50.4; N, 7.19. Theory for $C_6F_{10}(CONH_2)_2$: C, 27.4; H, 1.14; F, 54.3; N, 8.01.

EXAMPLE 4

If hydrazine is substituted for $NH_3$ in the above reaction, the corresponding dihydrazide

$$C_6F_{10}1,4-(CONHNH_2)_2$$

is produced.

EXAMPLE 5

*Preparation of diethyl ester derivative*

The diethylester of perfluorocyclohexane-1,4-dicarboxylic acid was prepared by reacting the diacyl fluoride with two mole equivalents of ethyl alcohol.

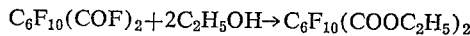
$$C_6F_{10}(COF)_2 + 2C_2H_5OH \rightarrow C_6F_{10}(COOC_2H_5)_2$$

The resulting diethyl ester had a boiling point of 104°–107° C. at 4 mm. pressure. An elemental analysis gave the following results:

Calculated for $C_{12}H_{10}F_{10}O_4$: C, 35.3; H, 2.45; F, 46.7. Found: C, 34.9; H, 2.49; F, 47.2.

An infrared spectrogram was run on the diester and showed an absorption peak characteristic of the ester group at 5.62 microns.

EXAMPLE 6

*Preparation of dioctadecyl ester derivative*

The dioctadecyl ester of perfluorocyclohexane dicarboxylic acid was prepared as follows: A 0.70 gram (0.002 mole) sample of $C_6F_{10}$-1,4-$(COF)_2$ dissolved in 10 ml. of ether was added dropwise to a stirred solution of 1.08 grams (.004 mole) of octadecyl alcohol dissolved in 20 ml. of ether. The resulting solution was refluxed for 2 hours. The refluxed solution was then washed with water, then with a dilute $NaHCO_3$ solution, then with water, to remove acid formed in the reaction. The ether solution was dried with $CaCl_2$ and evaporated, yielding 1.6 grams of crude perfluorocyclohexane-1,4 dioctadecyl ester $C_6F_{10}$-1,4-$(COOC_{18}H_{37})_2$. The crude ester was recrystallized from benzene. The pure ester had a melting point of 57–58° C. Its infrared spectrogram no longer showed absorption peaks characteristic of —OH or —COF, but showed an absorption peak at 5.65 microns characteristic of the carbonyl ester group. Elemental analyses showed the following results:

$C_{44}H_{74}F_{10}O_4$—Calculated: C, 61.7; H, 8.64; F, 22.2. Found: C, 61.9; H, 8.93; F, 22.2.

EXAMPLE 7

*Preparation of perfluorocyclohexane monoacyl fluoride*

A 4.6 gram sample (0.02 mole) of $C_6F_5COCl$ and 5.0 grams of $CoF_3$ were mixed with 25 ml. of perfluorotributyl amine, boiling point 173° C., and heated to reflux for 5.5 hours with stirring. The $CoF_3$ changed from a dark brown to the pink color of $CoF_2$. Infrared analysis at this point still showed the main aromatic peak at 6.68 microns, indicating presence of unsaturation. An additional 5 grams of $CoF_3$ was added, and heating was continued at reflux for an additional 3 hours, when an additional 10 grams of $CoF_3$ was added and heating continued for another 2½ hours. At this point (total time, 11 hours) a test of the product indicated no unsaturation present. The resulting product showed a characteristic —COF peak at 5.38 microns. The spent $CoF_2$ was filtered off and the reaction mass subjected to distillation in a spinning band column, producing 1.1 grams of product, boiling point 76°–85° C., equivalent to a yield of 17% of perfluorocyclohexane monoacyl fluoride. A portion of the distillate was dissolved in ether and $NH_3$ was bubbled through the solution, converting it to the perfluorocyclohexane monoamide ($C_6F_{10}CONH_2$). This amide, upon recrystallization from $CHCl_3$, had a melting point of 110°–111° C. which agrees with the melting point reported in the literature.

EXAMPLES 8–11

*Perfluorocyclohexane 1,4-diacyl fluoride—liquid phase*

A 250 ml., 3-necked flask, equipped with stirrer, thermometer and water condenser was charged with 5.5 grams (0.02 mole) of $C_6F_4$-1,4-$(COCl)_2$, 5 grams of either $CoF_3$ or $AgF_2$ and 15 ml. of a liquid perfluoro compound reaction medium and heated to reaction temperature for about an hour with stirring. Then additional amounts of $CoF_3$ or $AgF_2$ were added and heating continued for the periods indicated in the table below. Heating was continued until infrared analyses taken periodically showed the absence of any absorption bands due to aromaticity, double bonds, or the acid chloride function. Instead, in each case there was one prominent absorption at 5.32 microns indicative of the COF group. At this point the total reaction mixture was subjected to flash distillation. The volatiles were caught in Dry Ice traps, and the cobalt fluoride remained as a residue. The condensed perfluorocyclohexane acyl fluoride product, boiling point 110° C., was distilled and recovered in the yields indicated in Table I below:

TABLE I

| Example No. | Fluorinating Agent | | Temp., °C. | Time, Hours | Percent Yield |
|---|---|---|---|---|---|
| | Formula | Grams | | | |
| 8 | $CoF_3$ | 30 | 120–135 | 6 | 19 |
| 9 | $CoF_3$ | 25 | 150–175 | 8 | 14 |
| 10 | $AgF_2$ | 35 | 150–160 | 3 | 12 |
| 11 | $CoF_3$ | 33 | 90–165 | 7 | 7 |

In Example 8 a vapor phase chromatographic analysis was carried out on the distillation residue and indicated that this portion contained an additional 0.90 gram of perfluorohexane-1,4-diacyl fluoride making a total yield of 32%.

EXAMPLES 12–14

*Perfluorocyclohexane-1,4-diacyl fluoride—vapor phase*

In three separate runs, a layer of solid fluorinating agent $CoF_3$ or $AgF_2$ equal to about 100 grams was placed into a 22 mm. (I.D.) Pyrex tube heated by a 12″ long horizontal furnace to the reaction temperature. A 5.5 gram (0.02 mole) sample of $C_6F_4$-1,4-$(COCl)_2$ was introduced into the above reaction tube by placing the sample in a vaporizer at 150° C. and bubbling a stream of nitrogen through it at 100 ml. per minute, thereby entraining $C_6F_4(COCl)_2$ vapor, of which about 1 gram per hour of $C_6F_4(COCl)_2$ was passed through the reactor. The effluents from the reactor were passed through Dry Ice traps wherein the resulting perfluorocyclohexane - 1,4 - diacyl fluoride was condensed. The product from the traps was collected and analyzed by vapor phase chromatographic analysis with the results shown in Table II below:

TABLE II

| Example No. | 12 | 13 | 14 |
|---|---|---|---|
| $C_6F_4(COCl)_2$ consumed | 4.4 | 5.0 | 5.5 |
| $CoF_3$ weight | 100 | | 100 |
| $AgF_2$ weight | | 110 | |
| Reaction Temp. °C | 225 | 225 | 300 |
| Product (grams) | 4.7 | 5.7 | 5.3 |
| $C_6F_{10}(COF)_2$ percent yield | 52 | 51 | |
| $C_6F_{11}(COF)$ percent yield | 22 | 37 | |

The resulting mixture of perfluorocyclohexane mono- and 1,4-diacyl fluorides is readily separated into its components by distillation because of the differences in boiling points of the two compounds, the monoacyl compound boiling at 77–78° C., the 1,4-diacyl compound at 106° C.

While the above describes the preferred embodiment of our invention, it will be understood that departures may be made therefrom within the scope of the specification and claims.

We claim:

1. Perfluorocyclohexane - 1,4 - diacyl fluoride of the formula

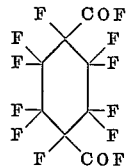

2. The process for preparing a perfluorocyclohexane acyl fluoride which comprises dispersing in an inert fluid medium a perfluorobenzene acyl halide of the formula:

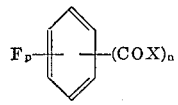

wherein X is a halogen selected from the group consisting of chlorine and fluorine, $n$ is an integer from 1 to 2 and $p$ is an integer which is 5 when $n$ is 1, and is 4 when $n$ is 2, said fluid medium being selected from the group consisting of inert perhalogenated liquids having boiling points between about 100° C. and about 300° C. and gases unreactive with fluorine, intimately contacting said dispersion with a stoichiometric excess of a solid pulverulent fluorinating agent selected from the group consisting of cobalt trifluoride and silver difluoride at temperatures of at least about 150° C., but not substantially in excess of the boiling point of the perfluorobenzene acyl halide, until substantially no aromatic unsaturation remains in the dispersion.

3. The process according to claim 2 wherein the dispersion medium is perfluorotributyl amine.

4. The process according to claim 2 wherein the dispersion medium is gaseous nitrogen.

5. The process according to claim 2 wherein the fluorinating agent is cobalt trifluoride.

6. The process according to claim 2 wherein the fluorinating agent is silver difluoride.

7. The process according to claim 2 wherein the perfluorobenzene acyl halide is perfluorobenzene-1,4-diacyl chloride.

References Cited

UNITED STATES PATENTS

| 2,614,129 | 10/1952 | McBee et al. | 260—544 |
| 2,717,871 | 9/1955 | Scholberg et al. | 260—544 |

OTHER REFERENCES

Stephens et al.: "Quarterly Reviews," vol. 162 (1962), pages 61–65.

LORRAINE A. WEINBERGER, *Primary Examiner.*

R. JACKSON, *Assistant Examiner.*